United States Patent
Liang

(10) Patent No.: US 7,523,306 B2
(45) Date of Patent: Apr. 21, 2009

(54) SIMPLIFIED CCMP MODE FOR A WIRELESS LOCAL AREA NETWORK

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1181 days.

(21) Appl. No.: 10/718,889

(22) Filed: Nov. 21, 2003

(65) Prior Publication Data

US 2004/0142710 A1    Jul. 22, 2004

Related U.S. Application Data

(60) Provisional application No. 60/440,575, filed on Jan. 16, 2003.

(51) Int. Cl.
*H04L 9/00* (2006.01)
*G06F 21/00* (2006.01)

(52) U.S. Cl. .................. 713/161; 713/181; 380/270

(58) Field of Classification Search ............ None
See application file for complete search history.

(56) References Cited

U.S. PATENT DOCUMENTS 6,128,737 A * 10/2000 Jakubowski et al. ........ 713/181
6,765,885 B2 * 7/2004 Jiang et al. ................. 370/328
7,171,493 B2 * 1/2007 Shu et al. ................... 709/246

OTHER PUBLICATIONS

ANSI/IEEE, 802.11 Standard—Part 11: Wireless LAN Medium Access Control (MAC) and Physical Layer (PHY) specifications, 1999, 1st Ed., pp. 40, 63-64.*

* cited by examiner

*Primary Examiner*—Gilberto Barren, Jr.
*Assistant Examiner*—Martin Jeriko P San Juan
(74) *Attorney, Agent, or Firm*—Steven A. Shaw; W. James Brady; Frederick J. Telecky, Jr.

(57) ABSTRACT

A system and method for generating a message integrity code, MIC, for a MAC protocol data unit in a wireless local area network, WLAN, operating according to the IEEE 802.11 standard. A MAC service data unit, MSDU, sequence control sequence number, SN, input to the MIC algorithm is suppressed, e.g. set to all zeros, when calculating the MIC. Only the fragment number, FN, portion of the sequence control is included in calculation of the MIC. The MIC may therefore be calculated before an actual SN has been determined. All MPDUs include sequential packet numbers, PNs. A station receiving MPDUs checks the PNs of MPDUs having the same SN, and rejects messages which do not have a proper sequential set of PNs.

19 Claims, 1 Drawing Sheet

SIMPLIFIED CCMP MODE FOR A WIRELESS LOCAL AREA NETWORK

CROSS-REFERENCE TO RELATED APPLICATIONS

This application claims priority from provisional U.S. patent application Ser. No. 60/440,575, entitled "Simplifying Implementation of CCMP Mode", filed on Jan. 16, 2003, which is hereby incorporated by reference for all purposes.

BACKGROUND

1. Field of the Invention

The present invention generally relates to communication systems. More particularly, the invention generally relates to wireless local area networks (WLAN) and more particularly still to a simplified method for CCMP mode encryption in a WLAN operating under the IEEE 802.11 standard.

2. Background Information

Initially, computers were most often used in a standalone manner. It is now commonplace for computers and other types of electronic devices to communicate with each other over networks. The ability for computers to communicate with one another has lead to the creation of small networks comprising two or three computers as well as vast networks comprising hundreds or even thousands of computers. Networks can be set up to provide a wide assortment of capabilities. For example, networked computers can be established to permit each computer to share a centralized mass storage device or printer. Further, networks enable electronic mail and numerous other types of services. Traditionally, networks have been established in a wired configuration in which each entity on the network has a direct physical electrical connection to the network. More recently, advances in wireless technology have made it possible for network devices to communicate with other devices via radio frequency (RF) or other types of wireless media.

Wireless networks are defined in various standards. The IEEE 802.11 standard, for example, permits a wireless local area network (WLAN) to be set up in a business or residence. In one form, the WLAN is a basic service set in which two or more stations communicate directly with each other, e.g. by radio frequency signals. In a more common configuration, one or more "access points" are set up at predetermined locations and are connected via cables to servers and other types of network equipment. Each access point also has a wireless radio capability to permit wireless communications with nearby wireless-enabled stations such as desktop computers, notebooks, handheld devices, and the like. Each access point has a certain range and a wireless-enabled device must be within that range for effective communications to occur. Through the access points, the wireless-enabled devices gain access to the network for data and file transfers, email, etc. The access points and wireless enabled stations have transmitters and receivers to perform the wireless communications.

Wireless transmission of data creates a number of challenges. It presents the opportunity for unauthorized reception of data transmitted from legitimate network stations and unauthorized transmission of data to legitimate network stations. For example, in a fragmentation attack an unauthorized station may receive one or more authentic data transmissions, possibly modify portions or reorder the fragments and then retransmit them. Serious damage can occur if an authorized station receives such unauthorized transmissions and performs various acts based on them. Such events may occur accidentally or intentionally. The IEEE 802.11i standard has been established to provide systems for controlling access to WLANs and providing security for transmitted data.

BRIEF SUMMARY

A method and system for generating a message integrity code, MIC, for counter mode CBC-MAC Protocol, CCMP, in which sequence numbers, SNs, of MAC protocol data units, MPDUs, are suppressed so that only the fragment number, FN, portion of the sequence control is included in the calculation of the MIC. A station receiving MPDUs checks the packet numbers, PNs, of received packets having the same SN and may reject the MPDUs which do not have a complete sequence of PNs.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Unless otherwise specified, the embodiments disclosed should not be interpreted as limiting, or otherwise used to limit, the scope of the disclosure or claims. In addition, one skilled in the art will understand that the following description has broad application. The discussion of any embodiment is meant only to be exemplary of that embodiment and is not intended to suggest that the scope of the disclosure or claims is limited to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. Further, all functions described herein may be performed in either hardware or software, or a combination thereof, unless indicated otherwise.

The IEEE 802.11i standard provides two encryption algorithms, temporal key integrity protocol, TKIP, and counter mode with CBC-MAC protocol, CCMP. The TKIP algorithm is intended primarily for legacy equipment. New equipment should use the CCMP algorithm. The present invention is directed to an improvement in the CCMP algorithm.

Figure 1:
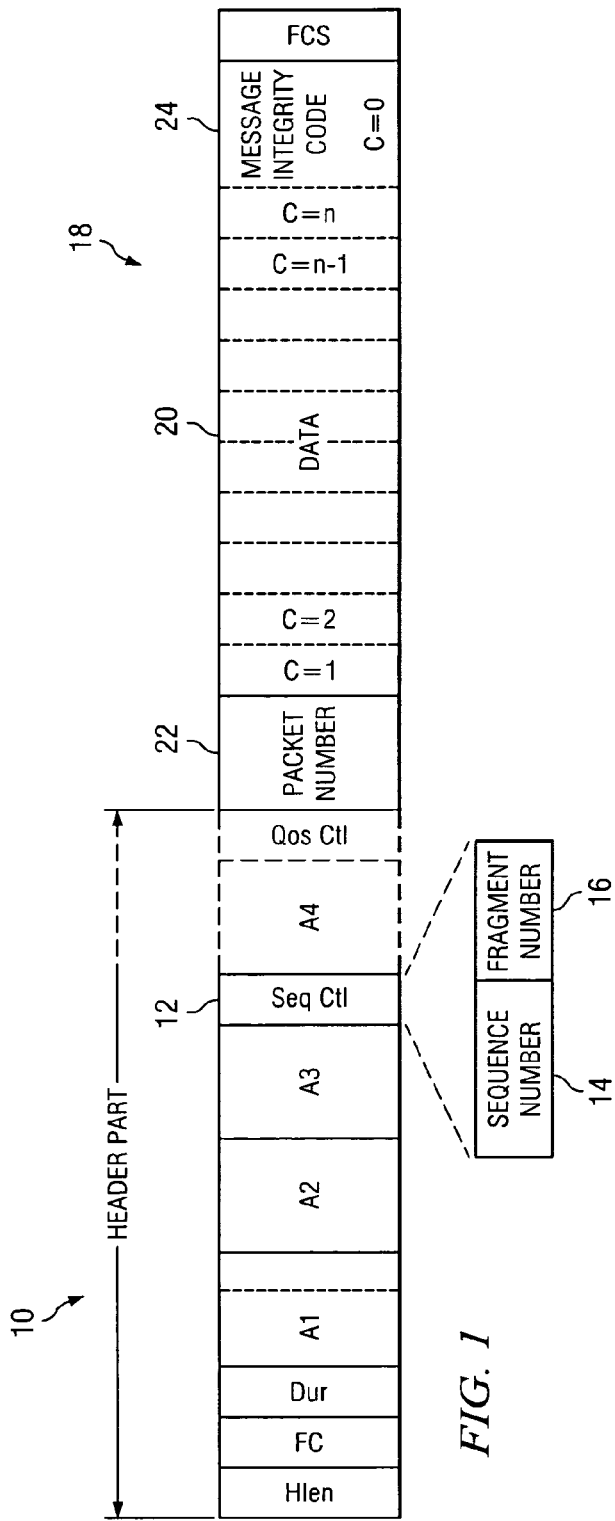
FIG. 1 illustrates a typical CCMP MPDU format.

Referring now to FIG. 1, there is illustrated the standard format of a CCMP MPDU. A MAC header portion 10 includes a number of parts such as the addresses of the sending station and the receiving station and a sequence control 12. The sequence control includes two octets, i.e. sixteen bits. The first twelve bits of the sequence control 12 provide a sequence number, SN, 14. The last four bits of the sequence control 12 provide a fragment number, FN, 16. A payload or data portion 18 includes a message or data 20 and also includes a packet number, PN, 22. A message integrity code, MIC, 24 follows the data portion 20. For purposes of the present invention, relevant parts of the MPDU format include the SN 14, FN 16, PN 18 and MIC 20

The SN 14 is an important part of the IEEE 802.11i standard. It provides a unique sequence number which identifies the order in which MAC service data units, MSDUs, are authorized to be transmitted in a WLAN. The SN 14 is useful, for example, in preventing replay attacks. That is, the SN 14 allows a receiving station to reject a newly received MSDU if it has an SN 14 lower than a previously received MSDU.

In a WLAN, at any given time a number of stations may be competing for a time to transmit data. The IEEE 802.11 standard provides a system for controlling the transmission times to avoid conflicts. Until a given station has been given a designated time to transmit, the SN 14 of a MSDU cannot be known. In the early IEEE 802.11i standard, the SN 14 is part of the information used to calculate the MIC 24. The MIC 24 is part of the transmission which is encrypted. As a result, the calculation of the MIC 24 and the encryption process could not be performed until the SN 14 for a MSDU was determined. There may be as little as thirty microseconds between the time a station is allocated a transmission time and the actual time of transmission. During this time, the SN 14 needed to be assigned, the MIC 24 needed to be calculated and the encryption had to be performed. To perform these operations in such a short time may require a processing speed of up to 1.2 Gbps. This speed requirement is difficult to implement and precludes various architectures. It may require a specific hardware solution instead of simply providing code for a conventional processor in a network station. Alternatively, the overall process could be slowed to provide the required time for calculation of the MIC 24 and encryption of the payload, but that would be undesirable.

If a MSDU payload exceeds a size limit set by the IEEE 802.11 standard, the payload is separated or fragmented into up to sixteen smaller packets, i.e. MPDUs, which meet the size limit. The FN 16 of each MPDU indicates the order in which the MPDUs were fragmented and therefore the order in which they must be read or reconnected to produce the complete payload of the original MSDU. For small MSDUs which do not need to be fragmented for transmission, the FN 16 indicates that it is the first fragment. The FN 16 is not dependent upon the SN 14, and can be, and normally is, determined before the SN 14 is determined. The original IEEE 802.11 standard included the complete sequence control 12, i.e. both SN 14 and FN 16, in calculation of the MIC 24 as part of security control.

The IEEE 802.11i security standard uses the SN 14, FN 16, the PN 22 and the MIC 24 in various ways to prevent replay attacks, fragmentation attacks, and other unauthorized transmissions. For example, if the SN 14 is smaller than a previously received SN, the system will consider the message part of a replay attack and may ignore it. The receiving station also uses the SN 14 to reassemble fragmented messages. That is, the receiving station knows that a group of received packets which have the same SN 14 are all part of the same message and attempts to reassemble them in the order provided by the FNs 16 to reproduce the entire original message.

The MIC 24 is calculated using various parts of the MPDU and is then encrypted before transmission. The MIC algorithm, known as Michael, uses information from the MAC header 10, such as the source and destination addresses, and in the original IEEE 802.11 standard the entire sequence control 12 and information from the payload 20, to calculate the MIC 24. The MIC 24 is also encrypted before transmission. When a message is received, the receiving station decrypts the message and uses the same MIC algorithm to calculate a MIC for the received message. If an attacker changes the information used to calculate the MIC 24, then upon reception of the data packet, the MIC calculated by the receiver will not match the transmitted MIC 24 and the system may reject the packet. The SN 14 was originally part of the information used in the MIC algorithm, but this causes a timing problem because the SN 14 is not known until just before the packet is to be transmitted.

In the present invention, the MIC 24 calculation includes the FN 16, but does not include the SN 14. The MIC may therefore be calculated as soon as a MSDU has been fragmented into MPDUs, because at that time the FNs 16 are known. In one embodiment, the MIC algorithm is not modified to operate without the SN 14. Instead, the SN 14 input to the MIC algorithm, i.e. the first twelve bits of the sequence control 12, is suppressed, i.e. set to all zeros, for the MIC calculation. The receiver likewise suppresses the actual SN 14 value when it calculates a MIC upon receipt of a packet. Alternatively, the SN 14 input to the MIC algorithm could be set to all ones or any combinations of zeros and ones, so long as the input is set to the same value for the MIC calculation by the sending station and the MIC calculation by the receiving station. The new IEEE 802.11i standard has selected the all zeros option as the method for suppressing the SN 14.

An embodiment of the present invention also includes a new security process of checking received messages for a complete sequence of PNs 22. When a MSDU is encrypted, each fragment is assigned a PN 22 in the sequence in which the MSDU was fragmented, i.e. in the same order as the FNs 16. The PN 22 includes eight octets, or sixty-four bits. The sequence is initialized, i.e. set to zero, when a new encryption key is set. The sequence does not repeat for any given key. When the MSDU is allocated a transmission time, it is given a unique sequential SN 14, which will be the same for every fragment, or MPDU, of the MSDU. When a station receives a number of MPDUs having the same SN 14, it checks the PNs 22 of the MPDUs in the order of the received FNs 16. Since the FNs 16 indicate the proper order in which the payloads of the MPDUs should be assembled to reproduce the original data or message of the MSDU, the PNs 22 should be in a continuous sequence. In the present invention, the PNs 22 are checked to be sure there is a complete sequence of PNs 22, without any gaps or repeats of the PNs 22. If the PNs 22 do not meet these requirements, it is safe to assume that there is an error in the transmission, possibly an intentional attack, and the entire message, i.e. all packets with the same SN 14 may be discarded.

Figure 2:
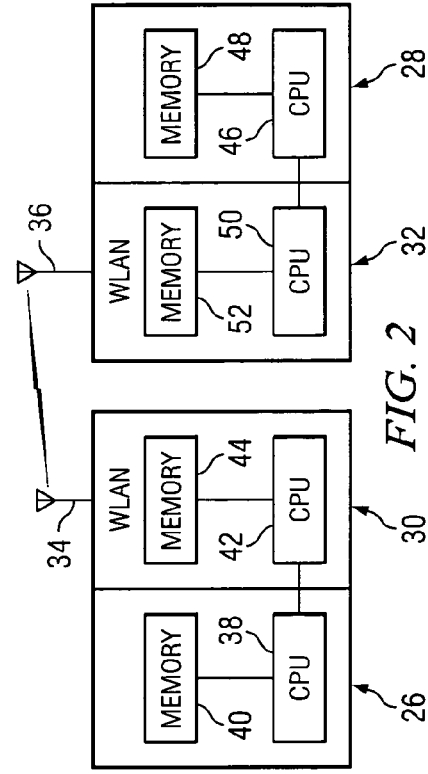
FIG. 2 is a general block diagram of two stations forming part of a WLAN illustrating the equipment in which the present invention may be embodied.

The method of the present invention allows more time for the calculation of the MIC, encryption, etc. As a result, the process may be implemented in the form of software which runs on a conventional processor in a station which is part of a WLAN. FIG. 2 is a generalized block diagram of a portion of a WLAN in which the present invention may be embodied. Two stations 26 and 28 may be personal computers or servers. A WLAN may comprise tens or hundreds of stations. Only two stations are illustrated for simplicity and because any given MPDU originates at one station and is received by another station. Each station 26, 28 has a WLAN module 30 and 32 respectively for sending and receiving wireless messages by way of antennas 34 and 36. In this embodiment, the modules 30, 32 use radio frequency signals for wireless communications. Infrared or other media could be used in place of RF if desired. The modules 30, 32 may be cards connected to external ports on the stations 26, 28 or may be built into the stations.

Station 26 includes a processor or CPU 38, and a memory unit 40 in which software, i.e. computer code, may be stored. The processor 38 is coupled to the memory 40 and to the WLAN module 30. The processor 38 may execute software code stored in memory 40 and may transmit and receive MPDUs though the WLAN module 30. The WLAN module 30 may also have a processor chip 42 and a memory unit 44. The processor 42 may execute code stored in memory unit 44. Memory 44 may include read only memory and the code in memory 44 may be considered firmware.

Station 28 includes a processor or CPU 46, and a memory unit 48 in which software, i.e. computer code, may be stored. The processor 46 is coupled to the memory 48 and to the WLAN module 32. The processor 46 may execute software code stored in memory 48 and may transmit and receive MPDUs though the WLAN module 32. The WLAN module 32 may also have a processor chip 50 and a memory unit 52. The processor 50 may execute code stored in memory unit 52. Memory 52 may include read only memory and the code in memory 52 may be considered firmware.

The computer code which performs the simplified CCMP mode according to various embodiments of the present invention may be stored in memory units 40 and 48 and/or in memory units 44 and 52. This code includes the MIC calculating code, Michael, the encryption code, code to suppress the SN 14 when calculating the MIC both upon transmission of a message and upon receipt of a message, code for comparing the transmitted MIC to the MIC calculated for a received message, code for checking the PNs 22 of received messages, and other operational code.

Various portions of the method may be executed in the processors 38 and 46 and/or in the processors 42 and 50. For example, code to manage or control the construction of MPDUs may be executed in the WLAN processors 42 and 50. However, if desired, the Michael code for calculation the MIC 24, the code for suppressing the SN 14, and/or the CCMP encryption algorithm may be executed in the station processors 38 and 46 under control of the WLAN processors 42 and 50. That is, the WLAN processors 42 and 50 may share part of the processing with the station processors 38 and 46

For a given message transmission, all of the code is not used in both stations 26 and 28 or their respective WLAN modules 30 and 32. For example if station 26 transmits a message, it will use code to suppress the SN 14 and use the Michael code for the calculation of the MIC 24 for the transmitted message. If station 28 receives the message it will again suppress the SN 14 of the received message and use the Michael code for calculation of a MIC 24 based on the received message. The receiving station will also compare the newly calculated MIC to the transmitted MIC and will also review the PNs 22 for a complete sequence. However, both stations 26 and 28 include all of such code, because they are able to both send and receive messages. The stations 26 and 28 or their respective WLAN modules 30 and 32 simply select the proper code depending on whether they are sending or receiving a message.

Thus, a system according to the present invention includes a conventional processor and memory storing the appropriate code for performing the simplified CCMP mode for a wireless local area network. No special high speed hardware, e.g. an application specific integrated circuit, is needed to meet the timing requirements which were required by the prior art method.

The method of the present invention has been found to provide security equal to the prior method which included the SN 14 in calculation of the MIC 24. For example, in one type of fragmentation attack, fragments, i.e. MPDUs, from several different MSDUs may be combined and transmitted as a new message. The attacker may modify the SN 14 to make it look like a new message. However, the FNs 16 will not be sequential. If the FNs 16 are changed, the MIC 24 of the transmitted message will not match the MIC calculated by the receiver.

An attacker may try to combine several single fragment MSDUs to look like a fragmented MSDU by changing the SNs 14 to be the same. However, each of the MSDUs would have FNs 16 indicating that they are the first packet. Thus, there would be a repeated FN 16 and no sequence of PNs and the system would identify a problem. If the FNs 16 are changed, the MIC 24 of the transmitted message will not match the MIC calculated by the receiver.

An attacker may swap fragments, i.e. MPDUs, between several different MSDU to create a bogus MSDU. When the PNs are checked upon receipt, they will repeat and/or not be in proper sequence and may be rejected.

Likewise, other forms of attack may be identified with the system and method of the present invention. The fact that the MIC, which is in part based on the FNs 16, is encrypted, provides sufficient secure information to the receiving station to identify unauthorized, modified, etc. transmissions, especially when the PN 22 sequence check is used.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for generating a message integrity code in a wireless local area network operating under an IEEE 802.11 standard, comprising:
   separate a message into a plurality of fragments;
   suppressing a sequence number input to a message integrity code (MIC) algorithm;
   calculating a message integrity code based in part on a fragment number;
   encrypting the MIC without the sequence number;
   assigning packet numbers to message fragments in the order of fragmentation;
   assigning a sequence number to the message which is the same for each message fragments; and
   transmitting the message to a receiving station by a transmitter.

2. A method according to claim 1, further comprising, upon receipt of a plurality of messages having the same sequence number at a receiving station, checking the received packet numbers for a complete sequence.

3. A method according to claim 2, further comprising rejecting a message if it does not have a complete sequence of packet numbers.

4. In a wireless local area network message protocol in which each data unit is assigned a sequence number and a fragment number, a method of generating a message integrity code (MIC) a data unit comprising:
   using the fragment number, but not the sequence number as an input to a message integrity code (MIC) algorithm; and
   generating the MIC before the sequence number has been assigned to a packet.

5. The method of claim 4, further comprising assigning a packet number to each message fragment, receiving messages at a receiving station and checking packet numbers of received message for a complete sequence of packet numbers.

6. The method of claim 5, further comprising rejecting messages which do not have a complete sequence of packet numbers.

7. A method for providing security for messages transmitted over a wireless local area network, wherein the messages have a transmitted message integrity code (MIC) encrypted without a sequence number and assigned packet numbers to message fragments in the order of fragmentation, said method comprising:
   receiving, by a receiver, a plurality of messages with the same sequence number; and
   checking the packet numbers of each of the plurality of messages in the order received to determine whether the plurality of messages include a complete sequence of packet numbers.

8. A method according to claim 7, further comprising:
   upon receipt of a message, calculating a received message integrity code based in part on the fragment number for the received message.

9. A method according to claim 8, further comprising:
   comparing the transmitted message integrity code to the received message integrity code.

10. A method according to claim 9, further comprising:
   rejecting the received message if the transmitted message integrity code does not match the received message integrity code.

11. A method according to claim 7, further comprising:
   if the plurality of messages has an incomplete sequence of packet numbers, rejecting the messages identified by the sequence number.

12. A wireless network station comprising a processor programmed to:
   suppress a sequence number input to a message integrity code (MIC) algorithm;
   calculate a message integrity code based in part on a fragment number;
   encrypt the MIC without the sequence number;
   assign a packet number to each message fragment in the order of fragmentation; and
   assign a sequence number to the message which is the same for each message fragments.

13. A wireless network station according to claim 12 wherein the processor is programmed to:
   transmit a message including the message integrity code over a wireless local area network.

14. A wireless network station according to claim 12 wherein the processor is programmed to:
   receive a message including a message integrity code over a wireless local area network;
   suppress a sequence number input to a message integrity code algorithm; and
   calculate a message integrity code for the received message based in part on a fragment number.

15. A wireless network station according to claim 14 wherein the processor is programmed to:
   compare the message integrity code of the received message to the message integrity code calculated for the received message; and
   if the message integrity code of the received message does not match the message integrity code calculated for the received message, reject the received message.

16. A wireless network station according to claim 14 wherein the processor is programmed to:
   upon receipt of a plurality of messages having a common sequence number, check packet numbers of the messages for a complete sequence; and
   if the packet number sequence is not complete, reject all of the received with the common sequence number.

17. A wireless network station comprising a processor programmed to:
   assign sequence numbers to all messages in the order of transmission and include the sequence number in each transmitted message;
   assign fragment numbers to all messages in the order of fragmentation of each message and include the fragment number in each transmitted message; and
   calculate a transmitted message integrity code based in part on the fragment number for each transmitted message and include the transmitted message integrity code in each transmitted message.

18. A wireless network station according to claim 17 wherein the processor is programmed to:
   upon receipt of a message, calculate a received message integrity code based in part on the fragment number for the received message;
   compare the transmitted message integrity code to the received message integrity code; and
   reject the received message if the transmitted message integrity code does not match the received message integrity code.

19. A wireless network station according to claim 17 wherein the processor is programmed to:
   upon receiving a plurality of messages having the same sequence number, check the packet numbers of each of the plurality of messages to determine whether the plurality of messages include a complete sequence of packet numbers; and
   if the plurality of messages has an incomplete sequence of packet numbers, reject the messages identified by the sequence number.

* * * * *